Nov. 25, 1941.   T. AMELSE ET AL   2,263,689
VENT FOR CONTAINER
Filed Jan. 18, 1939
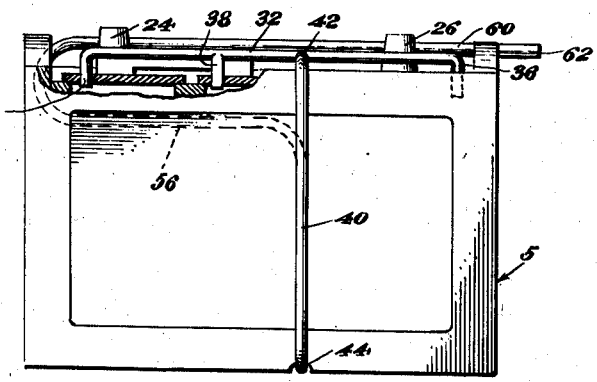
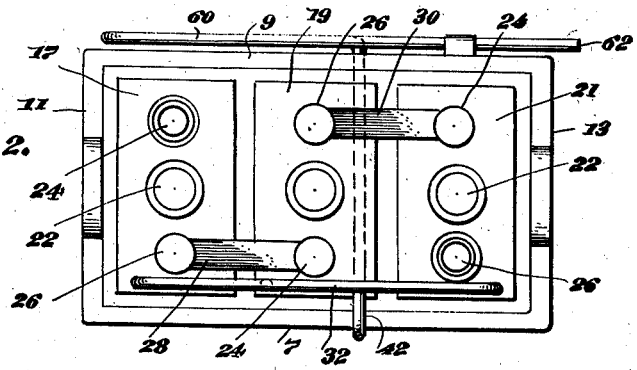
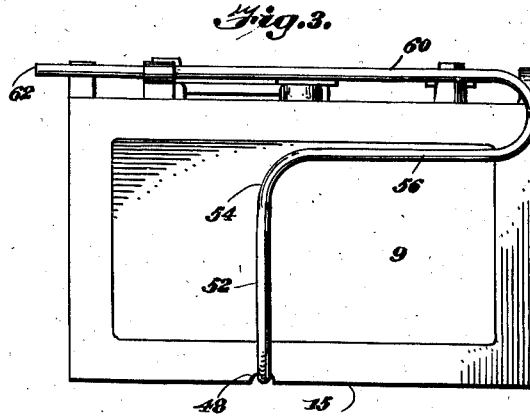
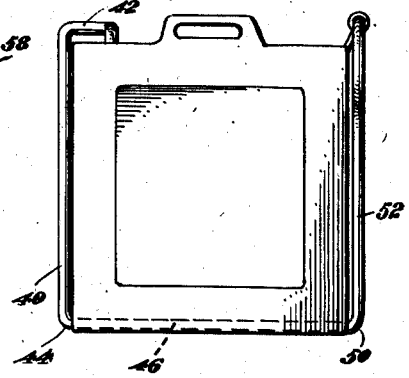
Inventor
THEODORE AMELSE
CHARLES YOUNGFER, Sr.
ROBERT O. WHIPPLE
Attorney Patented Nov. 25, 1941

2,263,689

UNITED STATES PATENT OFFICE 2,263,689

VENT FOR CONTAINER

Theodore Amelse, Charles Yungfer, Sr., and Robert O. Whipple, Tomahawk, Wis.

Application July 18, 1939, Serial No. 285,196

1 Claim. (Cl. 136—177)

This invention relates to venting means for containers and more particularly for storage battery cells.

The primary object of the invention is to provide a vent of the above mentioned character which will allow the escape of gases or fumes but will not allow the escape of the liquid contents of the receptacle, regardless of the position assumed or angle which the receptacle is tilted.

A further object of the invention is to provide a vent attachment for storage battery receptacles adapted to contain liquids which generate gases or fumes when enclosed so that the gas or fumes may escape at one end of the receptacle thereby preventing contact of the gases with terminal contacts of the container and the resulting corrosive effects produced thereby.

A still further object of the invention is to provide a vent for receptacles of the above mentioned character which will always have a high liquid level point irrespective of the position of the receptacle or the angle of inclination.

Other objects and advantages of the invention will become apparent during the course of the following description of the drawing wherein, Figure 1 is a side elevational view of the device embodying the invention applied to a storage battery, Figure 2 is a top elevational view illustrating the arrangement of the vent attachment with respect to the storage battery receptacle, Figure 3 is a side elevational view showing the reverse side of the storage battery receptacle from that shown in Figure 1, and Figure 4 is an end elevational view further illustrating the arrangement of the venting.

In the drawing, wherein for the purpose of detailed description, and wherein like reference characters will be employed to designate like parts throughout the same, the reference character 5 will generally be employed to designate a storage battery case or receptacle having opposed side walls 7 and 9 connected by end walls 11 and 13. A bottom wall 15 completes a case which is usually formed of hard rubber composition and mounted in the case 5 are storage battery cells 17, 19 and 21 having the filler openings closed by screw caps 22.

Each cell 17, 19 and 21 is provided with positive terminals 24 and negative terminals 26 and the central cell 19 has its terminals 24 and 26 connected to the end cell terminals 26 and 24 respectively by connector bars 28 and 30.

The above construction is typical of a present day storage battery and the invention comprises a vent therefor including a manifold pipe 32 having the ends thereof connected to the end cells 17 and 21 by extensions 34 and 36 projecting into the covers thereof, as clearly shown in Figure 1, to collect gases or fumes generated by the electrolyte in cells. A central extension 38 also connects the manifold 32 and is adapted to have its other end projecting into the cover of the central cell 19.

Connected adjacent one end of the manifold pipe 32 and extending down the side wall 7 of the battery case is a pipe 40 as at 42 the lower end of which is bent as at 44 and extends across the bottom wall 15 of the battery case, as at 46, in a transverse groove 48 formed therein.

The pipe 46 is also bent, as at 50, and extends up the reverse side 9 of the battery case in an extension 52 where it extends for a portion of its length and is bent as at 54 to extend toward end wall 11 of the case in a horizontal tubular portion 56.

After the horizontal tubular portion 56 reaches the end wall 11 of the battery case it is bent upon itself, as at 58, and extends horizontally toward the opposite end wall 13 of the case in a line 60 which terminates as at 62 slightly extended beyond the cell case 21.

It will thus be noted that should the battery be turned on its side wall 7, the electrolyte therein will seek its level in the transverse tube 46 and should it be turned on either end, the electrolyte will seek its level in the horizontal tubes 56 and 60.

It is to be understood that the above mentioned vent system could be formed by providing ducts in the battery or receptacle casing 5 arranged in identically the same manner as the vertical and horizontal tubes described and that the form of the invention herewith shown and described is to be taken as a preferred embodiment of the same and that various changes in the size, shape and arrangement of parts may be resorted to without departing from the spirit of the invention or the scope of the subjoined claim.

What is claimed is:

In combination with a storage battery including a rectangular shaped casing divided into a plurality of cells having covers thereon, a manifold extending longitudinally across the top portions of the cells having its free ends projecting into the end cells adjacent the outer corners thereof, a tube depending from the manifold and projecting into the central cell adjacent one corner thereof and communicating with the manifold, a tubing having one end connected to substantially the central portion of the manifold and extending downwardly of one side of the battery, transversely across the bottom thereof, upwardly of the other side of the battery and terminating short of the top edge thereof, and then extending longitudinally of the battery to one end of the battery thereof where it is bent upon itself to extend longitudinally of the top portiton of the battery with the free end terminating slightly beyond the other end of the battery, and supporting means for the tubing secured to the battery and the tubing adjacent the free end of the tubing.

THEODORE AMELSE.
CHARLES YUNGFER, Sr.
ROBERT O. WHIPPLE.